United States Patent [19]

Hughes

[11] Patent Number: 5,085,099
[45] Date of Patent: Feb. 4, 1992

[54] CAM LOBE HAVING ORIENTATING MEANS

[76] Inventor: Robert W. Hughes, 2155 14 Mile Rd., Sterling Heights, Mich. 48077

[21] Appl. No.: 535,750

[22] Filed: Jun. 8, 1990

[51] Int. Cl.⁵ .............................. F16H 53/00
[52] U.S. Cl. ...................... 74/567; 74/568 R; 29/888.1; 72/57
[58] Field of Search .............. 74/567, 568 R; 29/888.1; 72/57, 58, 61

[56] References Cited

U.S. PATENT DOCUMENTS

| | | | |
|---|---|---|---|
| 1,798,185 | 3/1931 | Burnett | 74/568 O |
| 2,794,103 | 5/1957 | Moore et al. | 74/567 X |
| 3,444,759 | 5/1969 | Kueny | 74/567 O |
| 3,838,609 | 10/1974 | Donkowski et al. | 74/567 X |
| 4,597,365 | 7/1986 | Madaffer | 74/567 X |
| 4,693,138 | 9/1987 | Hughes et al. | 74/567 |
| 4,738,012 | 4/1988 | Hughes et al. | 29/156.4 |
| 4,763,503 | 8/1988 | Hughes et al. | 72/57 |
| 4,798,178 | 1/1989 | Greulich et al. | 74/567 |

FOREIGN PATENT DOCUMENTS

| | | | |
|---|---|---|---|
| 0020051 | 2/1978 | Japan | 74/567 |
| 0248912 | 11/1986 | Japan | 29/888.1 |
| 0177357 | 8/1987 | Japan | 74/567 |
| 0311257 | 5/1929 | United Kingdom | 74/567 |

*Primary Examiner*—Richard Lorence
*Assistant Examiner*—Winnie Yip
*Attorney, Agent, or Firm*—Reising, Ethington, Barnard, Perry & Milton

[57] ABSTRACT

A cam shaft assembly (10) constructed from a plurality of lobes (14) spaced along the longitudinal axis of a tubular shaft member (12). Each lobe (14) is defined by a body portion (16) and a camming portion (20). The lobes (14) define a pair of oppositely facing radially extending side surface (22) which have axially extending shoulders (24) thereon. The shoulders (14) are for mating engagement with a gauging surface (44) to positively position the lobe (14) angularly with respect to the longitudinal axis while the lobes (14) are being secured to the tubular shaft member (12). The assembly (10) also includes bearing journals (18) on the tubular shaft member (12). A method and apparatus for making the cam shaft assembly (10) are also provided.

4 Claims, 3 Drawing Sheets

CAM LOBE HAVING ORIENTATING MEANS

BACKGROUND OF INVENTION

(1) Technical Field

The subject invention relates to an improved lobe for use on a cam shaft assembly and a method for making a cam shaft assembly.

(2) Description of the Prior Art

Cam shaft assemblies are well known in the art. The assemblies require precision placement of the lobes to ensure proper operation of the engine in which they are used. Deviation of as little as one millionth of an inch can cause an assembly to be scrapped.

Currently, two main methods are used to create a shaft assembly. One way is cast the entire cam shaft. Once cast, the assembly must be extensively ground to the exact tolerances for proper use in the engine.

An alternative method is to fixedly attach preground lobes to a tubular shaft to create the cam shaft assembly. Such an assembly and method for making the same are shown in U.S. Pat. Nos. 4,693,138 granted Sept. 15, 1987 and 4,738,012 granted Apr. 19, 1988, each to Hughes et al. An apparatus used to make such an assembly is shown in U.S. Pat. No. 4,763,503 granted Aug. 16, 1988 to Hughes et al.

These prior art cam shaft assemblies and method for making the same are sometimes lacking in that the lobes can not be precisely located (within the required tolerances) angularly relative to the shaft while the lobes are being secured to the shaft. Therefore, once the lobes are secured on the shaft, they are required to be finally machined or ground in order to bring the cam shaft assembly to within the required tolerances.

SUMMARY OF INVENTION AND ADVANTAGES

According to the present invention, there is provided a cam shaft assembly comprising a tubular shaft member defining a longitudinal axis. The assembly further comprises a plurality of lobes each having radially extending exterior side surfaces and spaced along the longitudinal axis of the tubular shaft member. The assembly is characterized by at least one of the side surfaces of each of the lobes having orientating means thereon adapted to engage a gauging surface for positively positioning the lobes angularly about the longitudinal axis while the lobes are being secured to the shaft.

A method for producing the cam shaft assembly from lobes having exterior side surfaces and interior apertures and spaced along the longitudinal axis of the tubular shaft member is also provided. The method comprises the steps of inserting the tubular shaft through the apertures of the plurality of lobes each having an orientating surface on at least one side. The method is characterized by rotating the orientating surface into engagement with a gauging surface positioned at a predetermined angular location relative to the longitudinal axis to precisely locate the lobes angularly with respect to the longitudinal axis.

Accordingly, there is provided a cam shaft assembly and method for making the same which positively positions the lobes at a precise angular location with respect to the shaft. By precisely locating the lobe angularly while securing the shaft to the lobes, a more precision cam shaft results. Therefore, the required final machining or grinding time after the lobes have been secured to the shaft is substantially reduced.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
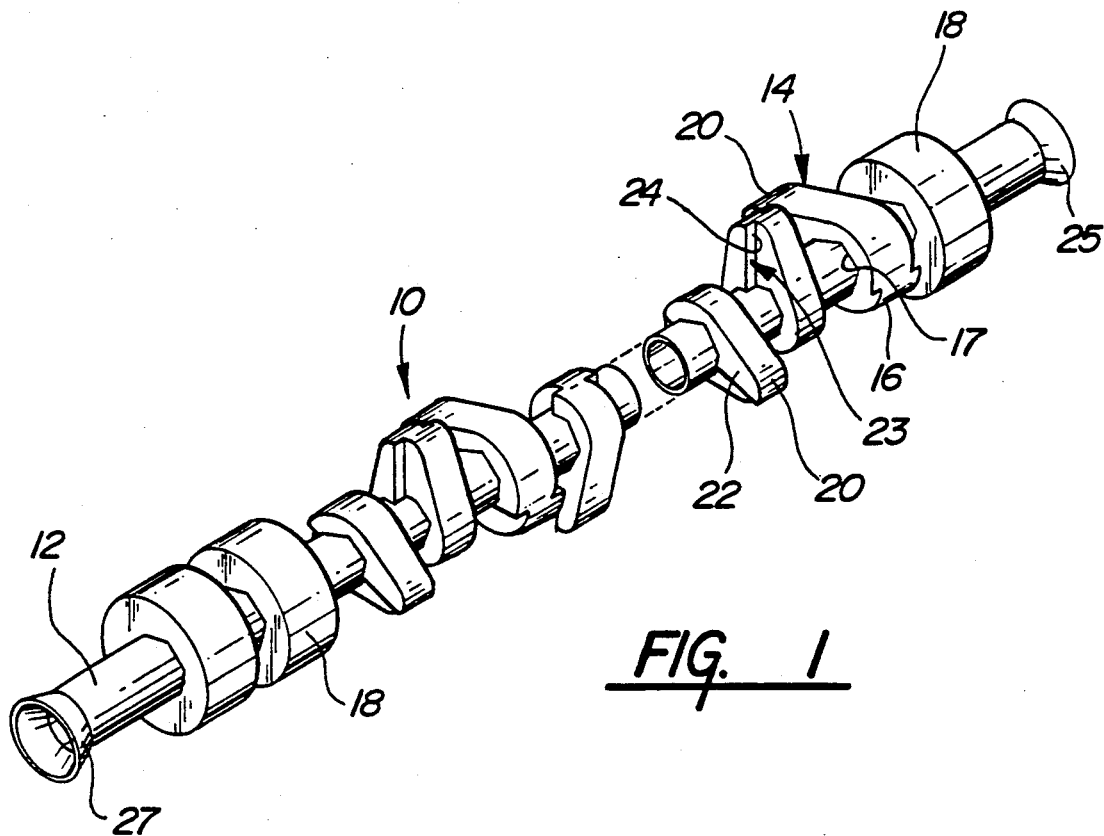
FIG. 1 is a perspective view of a cam shaft assembly.
Figure 4:
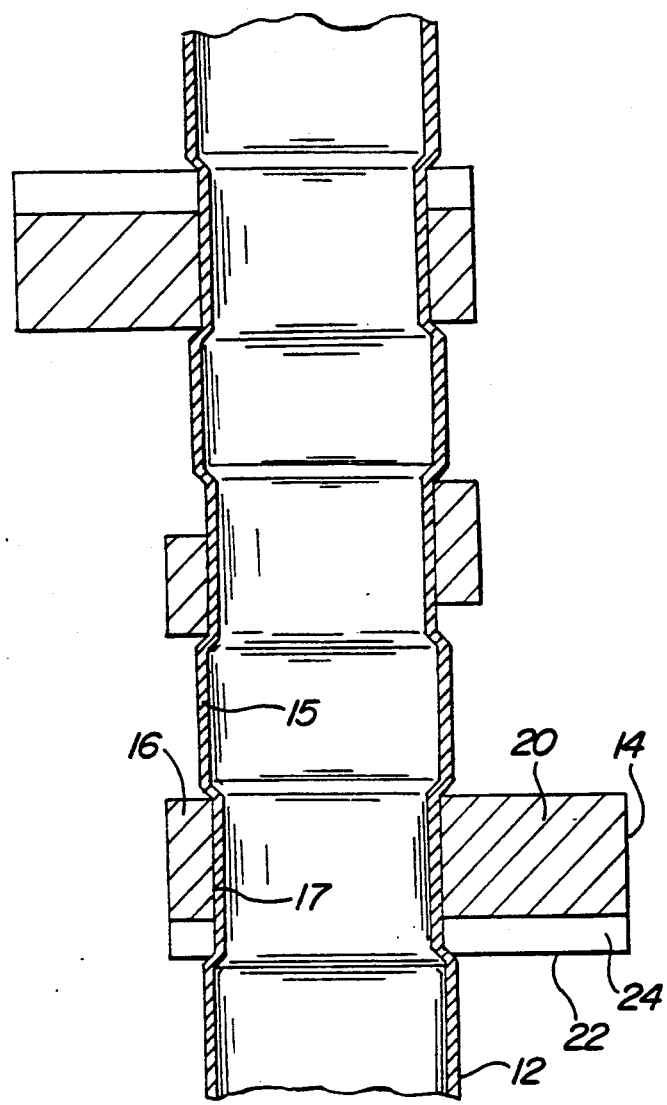
FIG. 4 is a partially broken away cross section of a completed cam shaft assembly.

A cam shaft assembly made in accordance with the method of the subject invention is generally shown at 10 in FIGS. 1 and 4. The cam shaft assembly 10 includes a tubular shaft member 12. Preferably, the tubular shaft member is hollow. A plurality of lobes generally indicated at 14 are spaced along the longitudinal axis of the tubular shaft member 12 and are fixedly secured thereto.

Figure 6:
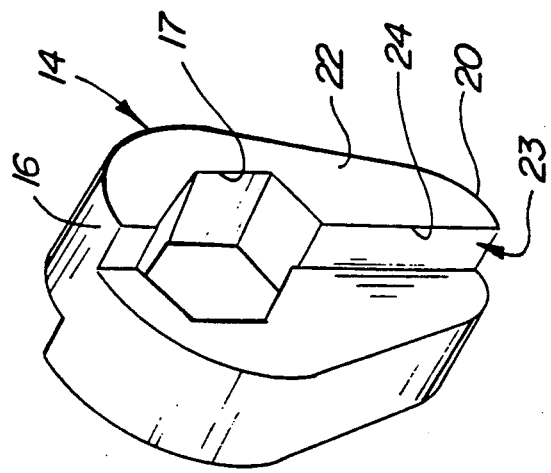
FIG. 6 a perspective view of a lobe.

As best viewed in FIG. 6, each of the lobes 14 has a body portion 16. The body portion 16 of each lobe 14 includes an irregular shaped opening 17 therethrough. The irregular shaped opening or aperture 17 is generally centered in the body portion 16 and is for receiving the tubular shaft member 12. By utilizing an irregular shaped opening or aperture 17, the engagement or fixed connection between the lobe 14 and the tubular shaft member 12 is enhanced.

Each of the lobes 14 further includes a camming portion 20 which extends outwardly from one side of the body portion 16 to a position radially further from the opening 17 than the body portion 16 (i.e., the camming portion 20 extends further from the opening 17 than does the body portion 16). The body portion and camming portion thus define the elongated lobe 14. The body portion 16 and camming portion 20 further define radially extending side surfaces 22 on each of the lobes 14. The side surfaces 22 extend radially to the longitudinal axis of the tubular shaft member 12. Each of the lobes 14 has a pair of oppositely facing side surfaces 22.

At least one of the side surfaces 22 on each lobe 14 has an orientating means generally indicated at 23 thereon. The orientating means 23 is adapted to engage a gauging surface 44 for positioning the lobe 14 angularly about the longitudinal axis of the tubular shaft member 12 while the lobe 14 is being secured to the tubular shaft member 12. Preferably, each of the oppositely facing side surfaces 22 has orientating means 23 thereon.

The orientating means 23 comprises an axially extending orientating surface 24 for mating engagement with the gauging surface 44 (as will be described subsequently). Preferably, the orientating surface 24 comprises a shoulder 24 on each of the side surfaces 22 of each of the lobes 14. The shoulders 24 extend the axial length of the side surface 22 and radially of the longitudinal axis of the tubular shaft member 12.

Figure 7:
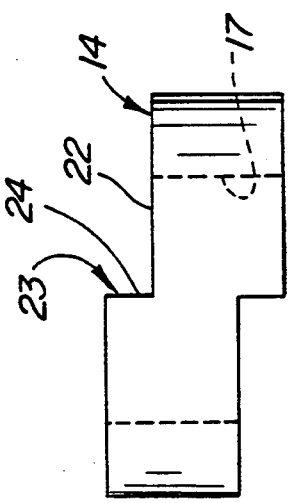
FIG. 7 is an end view of a lobe.

The shoulders 24 on each lobe 14 are opposite to one another so that portions of each lobe 14 on opposite sides of the shoulders 24 are axial offset from one another. In other words, by having shoulders 24 on opposite sides of the lobe 14, the lobe 14 defines an upper and lower half (as best viewed in FIG. 7) of approximately the same width and are axially offset from one another along the center line. That is, each of the side surface 22 has a step therein at the shoulder 24 between upper and lower halves of the lobe 14. The shoulder 24 or step positively positions the lobe 14 angularly with respect to the tubular shaft member while securing the lobe 14 to the tubular shaft member 12 by contacting the gauging surface 44. It is preferred that each shoulder 24 extend along the center line of the side surface 22. In this manner the shoulder 24 extends to the furthest point radially spaced from the longitudinal axis of the shaft 12. Thus, the angular position of the lobe 14 with respect to the tubular shaft 12 can be maintained with greater precision when the shoulder 24 contacts the gauging surface 44. By utilizing a lobe 14 having shoulders on either side thereof manufacture of the assembly 10 is facilitated. That is, during manufacture, the lobes 14 are placed on the tubular shaft 12 and then positioned in a die; because the lobes 14 have identical shoulders 24 on each side 22 thereof, they can be placed on the tubular shaft member 12 without having a backward orientation.

The cam shaft assembly 10 also includes bearing journals 18, or the like, positioned on the tubular shaft member 12. The bearing journals 18 are for balancing and stabilizing the cam shaft assembly 10.

It is to be noted that the lobes 14 and bearing journals 18 of the cam shaft assembly 10 may be made of different materials from the tubular shaft member 12 itself. Furthermore, the lobes 14 and bearing journals 18 may be made from materials which are different from one another.

In the preferred embodiment, the tubular shaft member 12 as shown in FIG. 1, includes first and second flared ends 25,27 which facilitate the sealing of the tubular shaft member 12 while the various steps of the method are performed.

Figure 2:
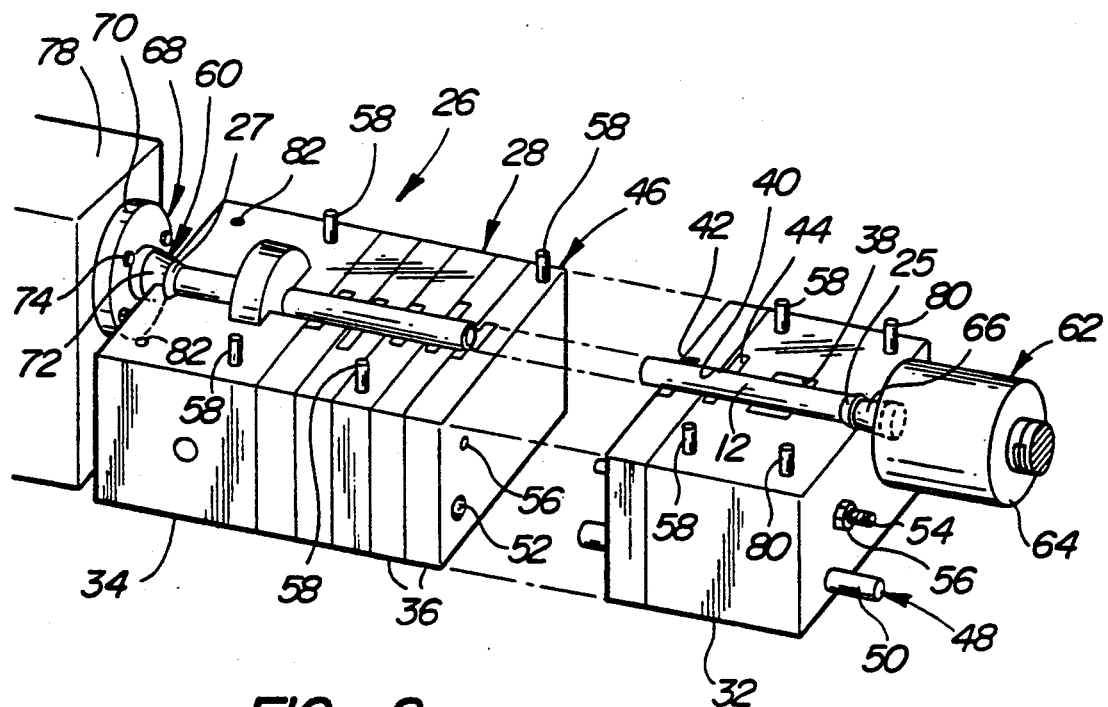
FIG. 2 is a perspective view of a preferred embodiment of an apparatus of the subject invention.

Turning now to FIG. 2, there is shown an apparatus generally indicated at 26 for making the cam shaft assembly 10. Specifically, FIG. 2 shows one half generally indicated at 28 of the apparatus or die generally shown at 26 which includes an upper half generally indicated at 30 (FIG. 3) and the lower half 28. The lower half 28 includes two end plates 32,34 between which are sandwiched a plurality of individual cam plates 36. The end plates or blocks 32,34 are rectangular in shape and add stability to the apparatus 26. The end plates 32,34 include recesses 38 for receiving and securely holding bearing journals 18, or the like, while the journals 18 and lobes 14 are being fixedly secured to the tubular shaft member 12. The cam plates 36 are also rectangular in shape but not as longitudinally thick as the end plates 32, 34.

The plurality of cam plates 36 each include openings therein for surrounding the hollow tubular shaft member 12 and the lobes 14 at spaced and predetermined intervals for radially and axially positioning the lobes 14 with respect to the axis. That is, a longitudinally extending shaft opening 40 extends through all of the plates 32,34,36 for receiving the tubular shaft member 12. Each of the cam plates 36 further has a cam opening 42 for receiving the cam lobes 14.

The cam openings 42 define a gauging surface 44 therein. More specifically, the openings 42 include shoulders 44 therein for mating engagement with the corresponding shoulders or steps 24 of the lobe 14 to position the lobes 14 angularly with respect to the longitudinal axis of the tubular shaft member 12. The shoulders 44 are located at a predetermined angular position with respect to the longitudinal axis of the tubular shaft member 12.

By way of example, the cam shaft assembly as shown in FIG. 1 shows each of the lobes offset from the next adjacent lobe by approximately 90°. Thus, the apparatus 26 used to make the cam shaft assembly 10 would include a plurality of cam plates 36 each including a cam opening 42 therein for receiving a lobe 14. When the shoulder 24 of the lobe 14 extends horizontally (parallel to the top of the cam plate 36), the corresponding shoulder 44 in the cam opening 42 is formed between mating plates 36 of the upper 30 and lower 28 halves. That is, due to the stepped nature of the lobe, the openings 42 in the mating plates 36 from the upper 30 and lower 28 halves will be axially offset to angularly locate the lobe 14. When the lobe is positioned vertically (as in the second lobe 14 of FIG. 1), the shoulder 44 extends into the cam opening 42 as best seen in FIG. 2 and the opening 42 in both the upper and lower halves 30,28 are axially aligned. When the upper half 30 is positioned, all of the lobes 14 are positively positioned angularly with respect to the tubular shaft member 12. That is, each of the shoulders 24 engage the corresponding shoulder 44 in the cam openings 42. The tolerances between corresponding shoulders 24,44 is very close to accurately position the lobe 14 angularly.

The cam plates 36 sandwiched between the end plates 32,34 comprise restraining means which is generally indicated at 46. Any of the cam plates 36 may be interchanged or substituted with any other cam plate 36. In addition, any cam plate 36 may be deleted from the lower half 28. This feature provides flexibility for manufacturing cam shafts 10 for a larger range of internal combustion engines within which the number of valves may differ greatly.

A positioning means generally indicated at 48 is employed for precisely positioning the openings 38,42 relative to the longitudinal axis and one another to precisely position the exterior surfaces of the lobes 14 and journal bearings 18 along the longitudinal axis of the tubular shaft member 12. The positioning means 48 includes guide pins 50 which extend parallel to the longitudinal axis of the tubular shaft member 12 and the apparatus 26 through precision bored guide holes 52 in each cam plate 36 as well as in each end plate 32, 34 to precisely position each plate. The guide holes 52 are disposed concentrically with respect to one another and in precise relationship with the cam openings 42 and each plate 36 as well as the recesses 38 such that each plate 32,34,36 may be aligned precisely with respect to one another. Threaded end bolts 54 also extend parallel to the longitudinal axis of the apparatus 26 through the bolt holes 56 in each plate 32,34,36. A nut 56, or the like is threadedly disposed on the end bolts 54 and securely holds the plates 32,34,36 together.

When the apparatus 26 is assembled, the upper and lower halves, 30,28 respectively mate to define the enclosure in which the tubular shaft member 12, cam lobes 14 as well as bearing journals 18, or the like, are securely held. Fastening means 58 (FIG. 2) are employed for clamping each half 28,30 in mating engagement with each other to hold the tubular shaft member 12 and lobes 14 while the lobes 14 are being secured to the shaft member 12.

Also depicted in FIG. 2 is expansion means generally indicated at 60 for applying pressure to the interior of the tubular shaft member 12 to expand the tubular shaft member 12 into engagement with the interior of the apertures 17 and into engagement with the surface of the shaft opening 40. The expansion means 60 comprises a plug means generally indicated 62 which includes a body 64 and a conical plug 66 for both flaring and sealing the first end 25 of the tubular shaft member 12. A fluid sealing means 68 is disposed at the second or upper end 27 of the tubular shaft member 12. The fluid sealing means 68 includes a circular disk base 70 and a frustoconical sealing member 72 fastened to the base 70 by a plurality of machine screws 74, or the like. The frustoconical sealing member 72 includes an extendable ram rod 76 best shown in FIG. 3. The ram rod 76 is of smaller diameter than the inner diameter of the tubular shaft member 12. The rod 76 is extendable from the flat outer face of the frustoconical sealing member 72 immediately into the interior of the hollow tubular shaft member 12. The fluid sealing means 68 is also employed to flare the second end 27 of the tubular shaft member 12 which facilitates a tighter, more efficient seal. The fluid sealing means 68 is fixedly secured to a housing member 78 which provides support for the sealing means 68 and within which is housed a piston cylinder arrangement (not shown) for actuating the ram rod 76.

Figure 3:
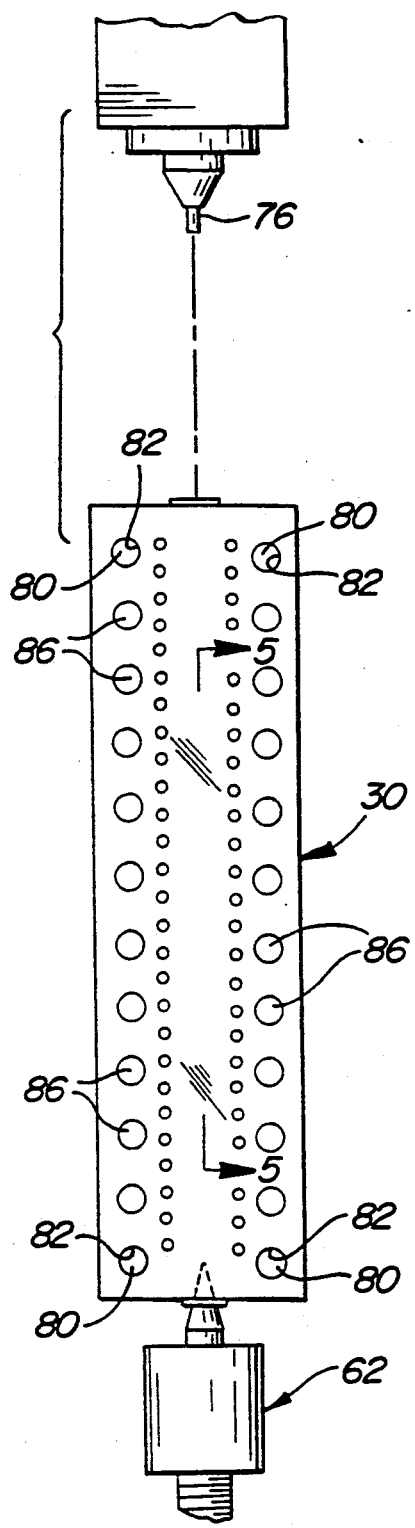
FIG. 3 is a top view of the fully assembled apparatus enclosing a hollow tubular shaft and lobes.

FIG. 3 is a top view of the assembled apparatus 26 enclosing the hollow tubular shaft member 12 and lobes 14. The upper half 30 of the apparatus 26 is shown and includes a plurality of alignment pins 80 disposed perpendicularly to the longitudinal axis of the apparatus 26 and extending through alignment holes 82 in the end plates 32,34 in both of the lower and upper halves 28,30 of the apparatus 26. The alignment pins 80 serve to precisely align the lower and upper halves 28,30 with respect to each other. In addition, the fastening means 58 disposed along both of the longer sides of the apparatus 26 extend through holes 86 in the plates 32,34,36 in both the lower and upper halves 28,30 of the apparatus 26. This view also depicts the plug means 62 disposed at the opposite ends 25,27 respectively of the tubular shaft member 12.

FIG. 4 is a broken away cross sectional view of a completed cam shaft assembly 10. This figure shows the cam lobes 14 radially and axially orientated and affixed to the shaft 12. The shoulders 24 on each of the lobes 14 are clear in this Figure. The shaft 12 is shown expanded outwardly to engage the irregularly shaped apertures 17 of the lobes 14 as well as expanded radially outwardly farther in the portions 15 in between the lobes 14 thereby fixedly securing the lobes axially as well as radially. The angular position of the lobes 14 relative to the tubular shaft member 12 is accomplished by the shoulders 24 of the lobes 14 engaging the gauging surface or corresponding shoulders 44 in the plates 36 during the expansion process. The radial expansion of the tubular shaft member 12 is restrained along the positions 15 between adjacent lobes 14 to a radial position greater than the radial expansion at the apertures 17 by the shaft opening 40. The expansion of the shaft 12 between lobes 14 defines shaft shoulders on the exterior of the tubular shaft member 12 adjacent each lobe 14 to prevent axial movement of the lobes 14 along the tubular shaft member 12. By utilizing irregular shaped openings 17, relative rotation between the lobe 14 and the expanded tubular shaft member 12 is prevented.

Figure 5:
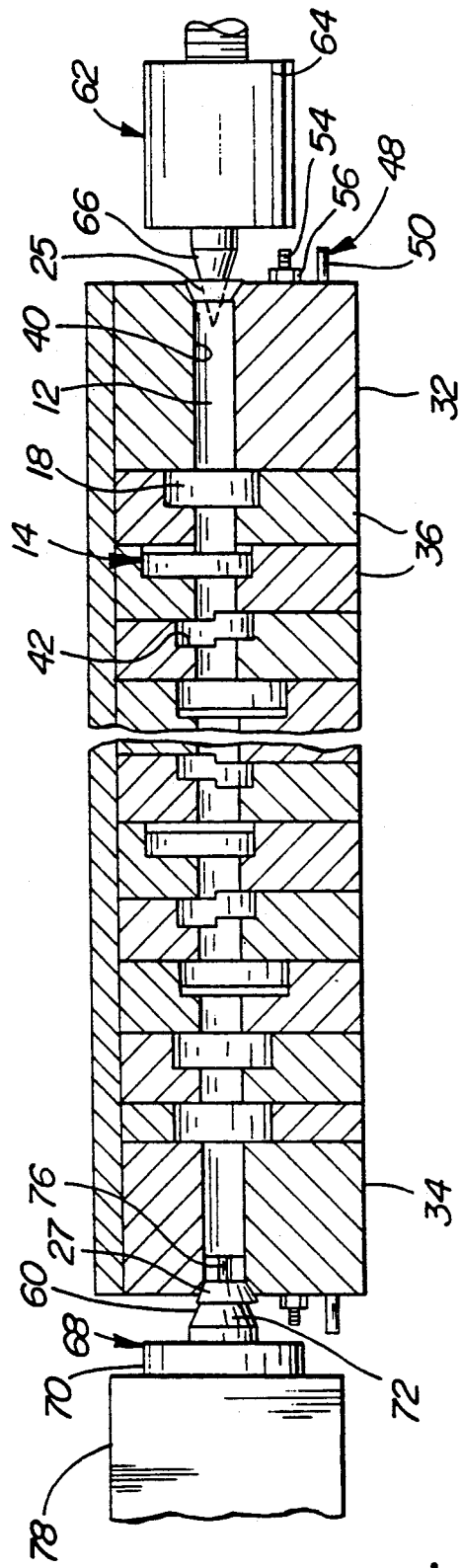
FIG. 5 is a cross section of the assembled apparatus with plug and sealing means engaging the opposite ends of the hollow tubular shaft.

FIG. 5 is a cross-sectional view of the apparatus 26 in its assembled state constraining the shaft member 12 and lobes 14 and depicting the engagement of the plug means 62 with first and second ends 20 and 22 of the tubular member shaft 12. In addition, the ram rod 76 is shown extended from the flat outer face of the frustoconical sealing member 72 into the tubular shaft member 12.

A method of making a cam shaft 10 from lobes 14 is also provided. Generally, the method comprises the steps of inserting the tubular shaft member 12 through the apertures 17 of a plurality of the lobes 14 each having an orientating surface or shoulder 24 on at least one side thereof. The orientating surface or shoulder 24 is then rotated or placed into engagement with a gauging surface, preferably the shoulder 44 in the cam openings 42 which are positioned at a predetermined angular location relative to the longitudinal axis of the shaft member 12 to precisely locate the lobes angularly with respect to the longitudinal axis of the tubular shaft member 12.

More specifically, the method comprises the steps of: inserting the hollow tubular shaft member 12 through the apertures 17 of a plurality of the lobes 14 and placing the shaft 12 and lobes 14 in the lower body portion 28 of the apparatus 26. The lobes 14 are then orientated axially and radially with respect to the longitudinal axis of the shaft 12 by placing the lobes over the opening 42 in the cam plates 36 which are located at predetermined intervals. Each of the lobes 14 are then rotated or positioned in the openings 42 of the plates 36 until the orientating surface 24 of the lobe 14 contacts the gauging surface 44. Specifically, the lobes 14 are rotated or placed in the openings 42 until the orientating surface or shoulders 24 on the side surfaces 22 thereof engage the corresponding shoulders 44 in the openings 42 of the cam plates 36. Thus, the angular position of the lobes 14 is held by the shoulder 24 thereon in contact with the high tolerance gauging surface or shoulder 44. The radial and axial positions of the lobe 14 are positioned by the exterior surface of the lobe 14 engaging the cam opening 42 in the plates 36 which are located at a predetermined axial position.

The upper half 30 of the apparatus 26 is then secured to the end plates 32, 34 as well as to a plurality of the cam plates 36 by tightening the fastening means 58 in the holes 86. The upper half 30 provides further orientation of the lobes 14 as well as constraining the lobes 14 and the tubular shaft member 12 and also providing sealing engagement with the lower body portion 28.

At least one end of the shaft 25 is flared but both ends 25 and 27 may be flared simultaneously by forcibly engaging the ends 25 and 27 with the plug means 62 and the fluid sealing means 68 respectively. The ends 25, 27 are flared into backing engagement with the apparatus 26 to prevent axial and radial movement thereof and to provide sealing surfaces for sealing engagement with the plug means 62 and the sealing means 68. The plug means 62 is then moved into sealing engagement with the interior of the first flared end 25 and the apparatus 26 is rotated upwardly to a substantially vertical position. The hollow tubular shaft member 12 is filled with liquid and the fluid sealing means 68 is moved into sealing engagement with the interior of the second flared end 27 of the hollow tubular shaft member 12 thereby clamping the tubular shaft member 12 between the plug means 62 at the first flared end 25 and the fluid sealing means 68 at the second flared end 27.

The ram rod 76, of smaller diameter than the interior of the hollow tubular shaft member 12, is positioned within the fluid sealing means 68 and advanced or forced into the hollow interior of the shaft 12 thereby applying hydraulic force to expand the hollow shaft 12 into engagement with the interior of the apertures 17 of the lobes 14 as well as expanding the shaft 12 outwardly in between the lobes 14 and thereby fixedly securing the lobes 14 axially as well as radially. Again, the angular position of the lobes 14 are held in place by the shoulders or orientating surface 24 engaging the gauging surface or corresponding shoulders 44 in the opening 42 of the plates 36 while the tubular shaft member 12 is being expanded thereby fixedly securing each lobe 14 to the tubular shaft member 12.

Upon completion of the expansion of the shaft 12 into the above-mentioned engagement, the plug means 62 is disengaged to break the seal and then the ram rod 76 is retracted. The fluid sealing means 68 is disengaged and the cam shaft assembly 10 is removed from the apparatus 26. The flared ends 25 and 27 are then removed from the cam shaft assembly 12, e.g., the flared ends are cut off as by a saw.

It will be appreciated that the orientating surface 24 of the lobes 14 may be rotated or placed into engagement with the gauging surface 34 prior to inserting the tubular shaft member 12 through the apparatus 17 in each lobe 14. Furthermore, expansion of the tubular shaft member 12 may be carried out in any manner.

The resultant cam shaft assembly 10 provides a relatively low cost, high quality cam shaft which is very strong and durable. The angular position of the lobes is more precisely achieved thereby substantially reducing the machining time required to bring the cam shaft assembly 10 into required tolerances for use in an internal combustion engine.

The invention has been described in a illustrative manner and it is to be understood that the terminology which has been used is intended to be in the nature of words of description rather than limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A camshaft assembly (10) comprising: a tubular shaft member (12) defining a longitudinal axis; a plurality of lobes (14) each having radially extending exterior side surfaces (22) and spaced along said longitudinal axis of said tubular shaft member (12); said assembly characterized by said side surfaces (22) of said lobes (14) having orientating means (23) thereon for positively positioning said lobes (14) in predetermined angular positions about said longitudinal axis, said lobes having been secured to said shaft member, each of said lobes (14) having a pair of said side surfaces (22), said pair of side surfaces (22) being oppositely facing, said orientating means (23) including an axially extending shoulder (24) with each of said side surfaces (22), each of said shoulders (24) extending radially of said longitudinal axis.

2. An assembly as set forth in claim 1 further characterized by said shoulders (24) on each lobe (14) being opposite to one another so that portions of each lobe (14) on opposite sides of said shoulders (24) are axially offset from one another.

3. An assembly as set forth in claim 2 further characterized by said lobes (14) including a body portion (16) including an irregular shaped opening (17) therethrough for engaging said tubular shaft member (12) and generally centered in said body portion (16), and a camming portion (20) extending outwardly from said body portion (16) radially further from said opening (17) than said body portion (16), said body portion (16) and said camming portion (20) defining said exterior side surface (22).

4. A cam shaft assembly (10) comprising:
a tubular shaft member (12) defining a longitudinal axis;
a plurality of lobes (14) each having radially exterior side surfaces (22) and spaced along said longitudinal axis of said tubular shaft member (12);
said assembly characterized by at least one of said side surfaces (22) of each of said lobes (14) including an upper lobe half surface and a lower lobe half surface offset from said upper lobe half surface in the direction of said longitudinal axis, and a shoulder surface extending between said upper and said lower lobe half surfaces axially and radially of said longitudinal axis and transverse to each of said upper and said lower lobe half surfaces.

* * * * *